US 10,785,355 B2

(12) United States Patent
Liang

(10) Patent No.: US 10,785,355 B2
(45) Date of Patent: Sep. 22, 2020

(54) METHOD FOR APPLYING CELL PHONE SCREEN PROTECTOR

(71) Applicant: SHENZHEN KANGCHENGTAI INDUSTRIAL CO., LTD., Shenzhen, Guangdong (CN)

(72) Inventor: Zhaofei Liang, Guangdong (CN)

(73) Assignee: SHENZHEN KANGCHENGTAI INDUSTRIAL CO., LTD., Shenzhen (CN)

( * ) Notice: Subject to any disclaimer, the term of this patent is extended or adjusted under 35 U.S.C. 154(b) by 0 days.

(21) Appl. No.: 16/240,801

(22) Filed: Jan. 7, 2019

(65) Prior Publication Data

US 2019/0394317 A1    Dec. 26, 2019

(30) Foreign Application Priority Data

Jun. 26, 2018 (CN) .......................... 2018 1 0672156

(51) Int. Cl.
*H04M 1/00* (2006.01)
*H04M 1/02* (2006.01)
*G06F 1/16* (2006.01)

(52) U.S. Cl.
CPC ........ *H04M 1/0266* (2013.01); *G06F 1/1607* (2013.01); *G06F 1/1656* (2013.01); *H04M 2201/38* (2013.01)

(58) Field of Classification Search
None
See application file for complete search history.

(56) References Cited

U.S. PATENT DOCUMENTS

| | | | | |
|---|---|---|---|---|
| 6,511,927 B1 * | 1/2003 | Ellis | ............... | A41D 13/1209 442/77 |
| 9,151,005 B1 * | 10/2015 | Hao | ............... | E01H 1/1206 |
| 2009/0186181 A1 * | 7/2009 | Mase | ............... | B29C 63/02 428/40.1 |
| 2013/0237017 A1 * | 9/2013 | Kondo | ............... | B32B 7/02 438/118 |
| 2014/0353201 A1 * | 12/2014 | Molineux | ............... | B65D 33/00 206/524.3 |
| 2016/0107416 A1 * | 4/2016 | Cohen | ............... | B29C 63/0047 428/41.4 |
| 2019/0033922 A1 * | 1/2019 | Chou | ............... | G06F 1/1626 |
| 2019/0098120 A1 * | 3/2019 | Deng | ............... | C09J 7/00 |

FOREIGN PATENT DOCUMENTS

CN        107825765 A        3/2018
CN        207481371 U        6/2018

* cited by examiner

*Primary Examiner* — Meless N Zewdu
*Assistant Examiner* — Alexander J Yi

(57) ABSTRACT

A method for applying a screen protector to a cell phone screen protector is provided, including: providing a cell phone screen protector and a cell phone to be applied; cleaning a screen of the cell phone to be applied; tearing off the release liner by the label of the release liner, simultaneously lightening the screen of the cell phone to be applied, and sticking the silicone protective film on the screen, and uncovering the first part via the label of the first part; using a scraping card to scrape slightly from top to bottom; uncovering the second part via the label of the second part, and using the scraping card to scrape slightly from top to bottom; using the scraping card to scrape outwardly along a curved edge of the screen; tearing off the PET release film, and smoothing both sides of the screen.

12 Claims, 5 Drawing Sheets

METHOD FOR APPLYING CELL PHONE SCREEN PROTECTOR

CROSS REFERENCE

This application claims priority to Chinese Patent Application No. 201810672156.2, filed with the Chinese Patent Office on Jun. 26, 2018 and entitled "METHOD FOR APPLYING CELL PHONE SCREEN PROTECTOR", which is incorporated herein by reference in its entirety.

TECHNICAL FIELD

The present application relates to the technical field of applying a screen protector to a cell phone, and more particularly to a method for applying a screen protector to a cell phone.

BACKGROUND

Electronic products such as cell phone have become an indispensable part of people's daily lives, and with the continuous development of technology, the performance and appearance of the cell phone are constantly upgraded. In order to better protect the cell phone, people usually stick a screen protector on the screen of the cell phone to prevent the screen of the cell phone from being scratched and polluted. However, the existing applying methods still have some shortcomings, such as in the applying process, the positioning of the screen protector is not accurate to result in a deviation of the position of the screen protector, which will affect the appearance of the cell phone, and more serious need to replace the cell phone screen protector, and in turn causes waste of the screen protector. In addition, during the applying process, the screen protector may move during operation, which also causes a deviation in the final position of the screen protector. In addition, the current applying method requires correction of the screen protector by means of some fixtures, and the consumer needs a plurality of steps to stick the screen protector, and the applying efficiency is not high.

SUMMARY

An object of the present application is to provide a method for applying a screen protector to a cell phone, in order to solve the problem that the positioning of existing applying method is not accurate and the applying efficiency is not high.

The present application is achieved as follows: a method for applying a cell phone screen protector, including the steps:

step 1, providing a cell phone screen protector and a cell phone to be applied, wherein the cell phone screen protector comprises a PET release film, a TPU hydrogel film, a silicone protective film, and a release liner sequentially stacked from top to bottom, the silicone protective film is provided with a die-cut line dividing the silicone protective film into a first part and a second part, and the edges of the PET release film, the first part, the second part, and the release liner are respectively extend labels outwards;

step 2, cleaning a screen of the cell phone to be applied;

step 3, tearing off the release liner by the label of the release liner, simultaneously lightening the screen of the cell phone to be applied, and sticking the silicone protective film on the screen referring to a position at the cell phone screen protector corresponding to a handset and printing scale lines at a left side and right side of the cell phone screen protector;

step 4, pressing the cell phone screen protector, and uncovering the first part via the label of the first part;

step 5, using a scraping card to scrape slightly from top to bottom until the first part sticks to a planar portion of the screen;

step 6, uncovering the second part via the label of the second part, and using the scraping card to scrape slightly from top to bottom until the second part sticks to a planar portion of the screen;

step 7, using the scraping card to scrape outwardly along a curved edge of the screen until both sides of the TPU hydrogel film are stuck to both sides of the screen;

step 8, tearing off the PET release film by the label of the PET release film, and smoothing both sides of the screen via a hand.

Further, a top end of the release liner extends outward to form a first label, a right side of the first part extends outward to form a second label, a right side of the second part extends outward to form a third label, and a right side of the PET release film extends outward to form a fourth label.

Further, a top end of the release liner extends outward to form a first lug, a bottom end of the release liner extends outward to form a second lug, a top end of the first part corresponding to the position of the first lug extends outward to form a third lug, and a bottom end of the second part corresponding to the position of the second lug extends outward to form a fourth lug.

Further, the step 2 includes the following steps:

wiping the screen of the cell phone to be applied with an alcohol bag;

wiping the screen of the cell phone to be applied with a non-woven fabric.

Further, in the step 3, repeatedly performing the step of sticking the silicone protective film on the screen referring to a position at the cell phone screen protector corresponding to a handset and printing scale lines at a left side and right side of the cell phone screen protector.

Further, in the step 4, the step of uncovering the first part by the label of the first part includes: uncovering the first part upwardly, then pulling the second label to tear off an end of the first part adjacent to the second part, such that the end of the first part adjacent to the second part is separated from the TPU hydrogel film and abuts on the screen.

Further, in the step 6, the step of uncovering the second part via the label of the second part includes: uncovering the second part upwardly to reach an angle between the second part and the screen of 90 degrees, then pulling the third label to tear off an end of the second part adjacent to the first part, such that the end of the second part adjacent to the first part is separated from the TPU hydrogel film and abuts on the screen.

Further, in the step 5, a bottom end of the scraping card is placed in parallel with the die-cut line, and the initial position of the scraping card is located in front of the die-cut line.

Further, in the step 5, a bottom end of the scraping card is obliquely placed with the die-cut line, and the initial position of the scraping card is located on the die-cut line.

Further, in the step 3, a surface of the PET release film is further printed with a positioning pattern, and after the step of lightening the screen of the cell phone further includes a step of opening a wallpaper corresponding to the positioning pattern in the cell phone to be applied.

The method for applying a screen protector to a cell phone of the present application is completed with the following beneficial effects:

A cell phone screen protector coating method embodying the present application has the following beneficial effects: compared with the prior art, the present application by lightening the screen of the cell phone to be applied, and simultaneously positioning by the position of the handset of the cell phone screen protector combined with the left and right printing scale lines, the positioning accuracy is high. The first part is uncovered by the label of the first part, the second part is uncovered by the label of the second part, and the PET release film is torn off by the label of the PET release film, such that the cell phone does not move during the applying process, and the applying efficiency is improved.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

Figure 1:
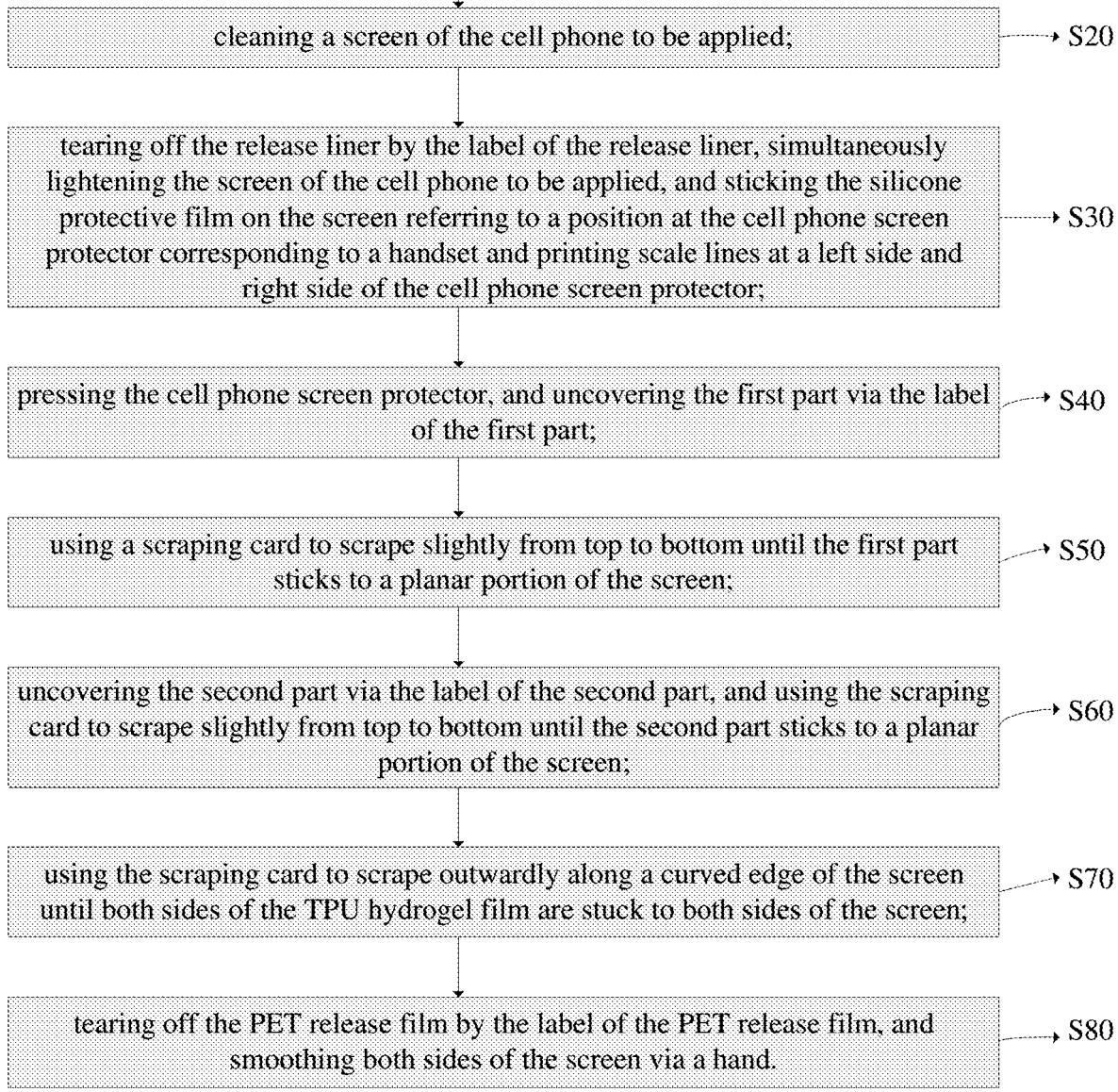
FIG. 1 is a flow chart of steps of a method for applying a screen protector to a cell phone according to an embodiment of the present application.

In the drawings, the reference numerals are as follow:
1—PET release film; 11—fourth label;
2—TPU hydrogel film;
3—silicone protective film; 31—first lug; 311—first label; 312—third lug; 32—second part; 321—third label; 322—fourth lug;
4—release liner; 41—first label; 42—first lug; 43—second lug.

DETAILED DESCRIPTION OF THE EMBODIMENTS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed at" another component, it can be directly or indirectly on another component. When a component is referred to as being "connected to" another component, it can be directly or indirectly connected to another component. Directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application. Terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

First Embodiment

Figure 2:
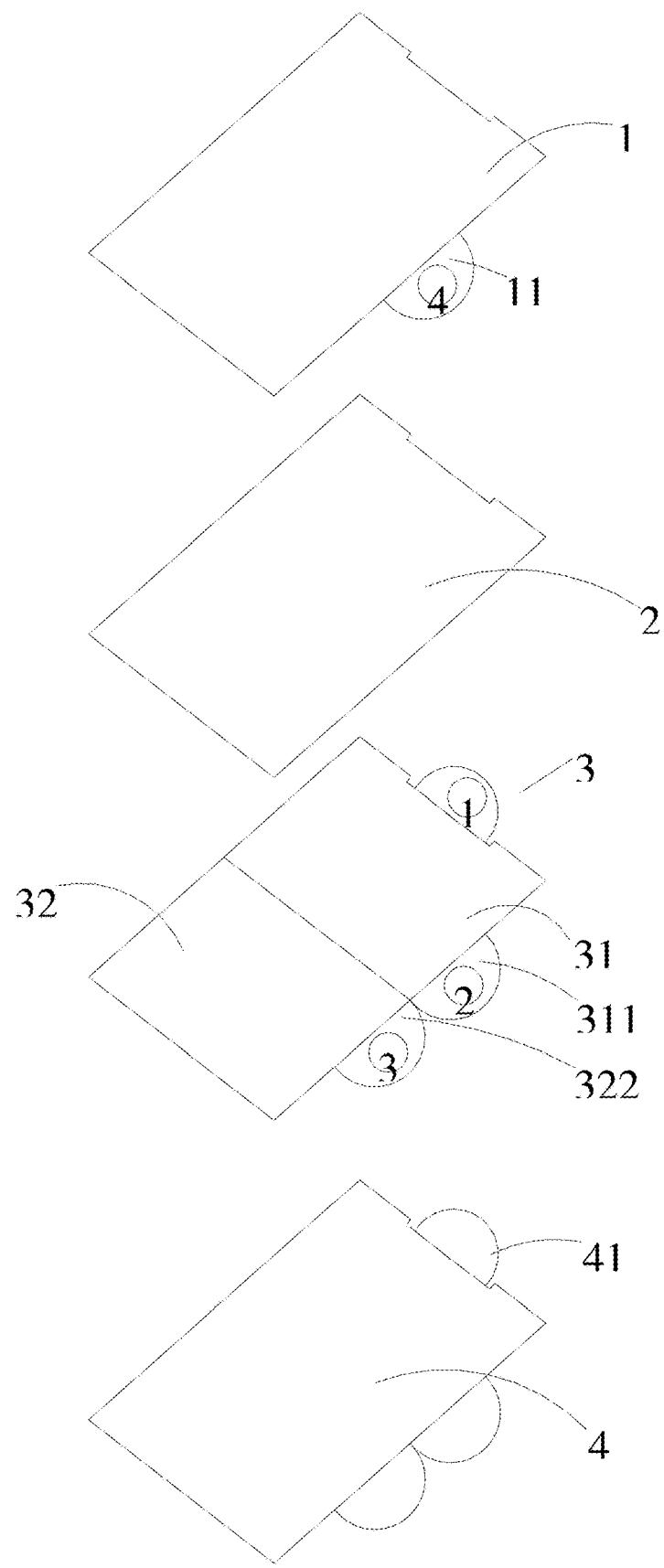
FIG. 2 is a structural exploded view of a cell phone screen protector according to an embodiment of the present application.
Figure 3:
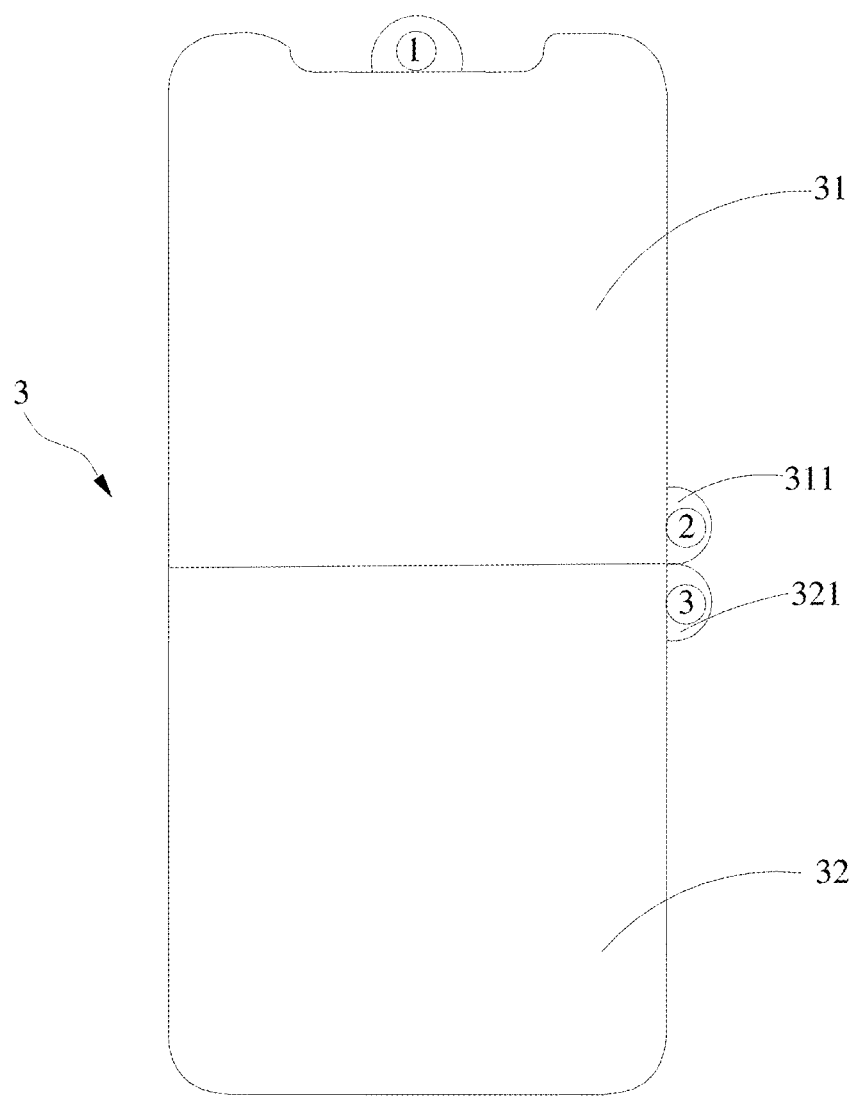
FIG. 3 is a structural exploded view of a silicone protective film in a cell phone screen protector according to an embodiment of the present application.

As shown in FIG. 1-3, the method for applying a screen protector to a cell phone in an embodiment of the present application particularly includes the following steps:

S10, providing a cell phone screen protector and a cell phone to be applied, wherein the cell phone screen protector includes a PET release film 1, a TPU hydrogel film 2, a silicone protective film 3, and a release liner 4 sequentially stacked from top to bottom, the silicone protective film 3 is provided with a die-cut line dividing the silicone protective film into a first part 31 and a second part 32, and the edges of the PET release film 1, the first part 31, the second part 32, and the release liner 4 are respectively extend labels outwards;

S20, cleaning a screen of the cell phone to be applied;

S30, tearing off the release liner 4 by the label of the release liner 4, simultaneously lightening the screen of the cell phone to be applied, and sticking the silicone protective film 3 on the screen referring to a position at the cell phone screen protector corresponding to a handset and printing scale lines at a left side and right side of the cell phone screen protector;

S40, pressing the cell phone screen protector, and uncovering the first part 31 via the label of the first part 31;

S50, using a scraping card to scrape slightly from top to bottom until the first part 31 sticks to a planar portion of the screen;

S60, uncovering the second part 32 via the label of the second part 32, and using the scraping card to scrape slightly from top to bottom until the second part 32 sticks to a planar portion of the screen;

S70, using the scraping card to scrape outwardly along a curved edge of the screen until both sides of the TPU hydrogel film 2 sticked to both sides of the screen;

S80, tearing off the PET release film 1 by the label of the PET release film 1, and smoothing both sides of the screen via a hand. compared with the prior art, the embodiment of the present application by lightening the screen of the cell phone to be applied, and simultaneously positioning by the position of the handset of the cell phone screen protector combined with the left and right printing scale lines, the positioning accuracy is high. The first part 31 is uncovered by the label of the first part 31, the second part 32 is uncovered by the label of the second part 32, and the PET release film 1 is torn off by the label of the PET release film 1, such that the cell phone does not move during the applying process, and the applying efficiency is improved.

Further, in an embodiment of the present application, a top end of the release liner 4 extends outward to form a first label 41, a right side of the first part 31 extends outward to form a second label 311, a right side of the second part 32 extends outward to form a third label 321, and a right side of the PET release film 1 extends outward to form a fourth label 11. In the embodiment, the first label 41 is disposed at the top end of the release liner 4, so as to tear off the release liner 4 by pulling the first label 41; the second label 311 is disposed at the right side of the first part 31, so as to tear off the first part 31 by pulling the second label 311; the third label 321 is disposed at the right side of the second part 32, so as to tear off the second part 32 by pulling the third label 321; the fourth label 11 is disposed at the right side of the PET release film 1, so as to tear off the PET release film 1 by pulling the fourth label 11.

Optionally, the first label 41, the second label 311, the third label 321, and the fourth label 11 are in an arched or semi-circular, so as to prevent the screen of the cell phone from scratching. Further optionally, the first label 41 is integrally formed with the release liner 4, the second label 311 is integrally formed with the first part 31, the third label 321 is integrally formed with the second part 32, and the fourth label 11 is integrally formed with the PET release film 1, so that the structure and production process are simplified. It can be understood that, in other embodiments of the present application, the first label 41 can be pasted on the release liner 4, the second label 311 can be pasted on the first part 31, and the third label 321 can be pasted on the second part 32, the fourth label 11 can be pasted on the PET release film 1. Specifically, when it is necessary to tear off the release liner 4, the first part 31, the second part 32, or the PET release film 1, respectively, the corresponding label is pasted on, and then the corresponding portion is torn off by pulling the label.

Further, in order to facilitate identification of the structure of each layer of the cell phone screen protector, so as to accurately perform according to the applying step in the applying process, the first label 41, the second label 311, the third label 321 and the fourth label 11 are respectively printed with Arabic numerals, and the Arabic numerals are arranged in order of applying a screen protector to a cell phone. Specifically, according to the applying a screen protector to a cell phone step, the number 1 is printed on the first label 41, the number 2 is printed on the second label 311, the number 3 is printed on the third label 321, and the number 4 is printed on the fourth label 11.

Further, in this embodiment, the die-cut line of the silicone protective film 3 is arranged along the width direction of the cell phone screen protector, the second label 311 and the third label 321 are respectively disposed on both sides of the die-cut line, and the fourth label 11 is not overlapped with the second label 311 and the third label 321, at this time, the second label 311, the third label 321, and the fourth label 11 can be effectively distinguished, and the position of the die-cut line can also be determined.

Further, in the present embodiment, the length ratio of the first part 31 and the second part 32 of the silicone protective film 3 ranges from 1:2 to 1:1. That is to say, the die-cut line of the silicone protective film 3 is disposed adjacent to the position of the handset and is located at one-third to one-half of the length direction thereof, and the length of the second part 32 is slightly larger than the first part, so as to facilitate the positioning of the hydrogel film 2 during applying process, and reduce the bubbles in the TPU hydrogel film 2.

Further, the fourth label 11 is disposed at a middle position in the length direction of the PET release film 1.

It can be understood that, in other embodiments of the present application, the length ratio of the first part 31 and the second part 32 may also be other values, such as the first part 31 corresponding to the window of the cell phone.

It should be noted that, in the embodiment of the present application, a handset notch corresponding to the handset of the cell phone to be applied is respectively provided on the PET release film 1, the TPU hydrogel film 2, the silicone protective film 3, and the release liner 4. In the production process of the cell phone screen protector, the corresponding handset notch is formed by uniformly punching the cell phone screen protector, which can simplify the production process and reduce the production cost.

Further, in the step S20, the step of cleaning a screen of the cell phone to be applied particularly including:

S21, wiping the screen of the cell phone to be applied with an alcohol bag;

S22, wiping the screen of the cell phone to be applied with a non-woven fabric.

In which, the alcohol bag can eliminate bacteria and other visible dirt on the screen surface. The non-woven fabric can further remove the dirt on the screen surface and dry the alcohol on the screen surface to prevent the alcohol from damaging the screen surface for staying a long time.

Further, in the step S30, by pulling the first label 41 printed with the number 1 to tear off the release liner 4. The step of sticking the silicone protective film 3 on the screen referring to a position at the cell phone screen protector corresponding to a handset and printing scale lines at a left side and right side of the cell phone screen protector can be repeatedly performed. In which, the left and right printing scale lines are printed on both side edges of the release liner 4 and are arranged along the length direction of the release liner 4. Since the silicone protective film 3 has a dust-fixing function, the screen can be further cleaned by the process of repeatedly pasting the silicone protective film 3 on the screen. In addition, in step S30, scale lines are printed on the left and right sides of the surface of the PET release film 1, and the scale line is aligned with the edge of the screen of the cell phone to be applied, and the handset notch is corresponding to the position of the handset of the cell phone to be applied to realize the effective positioning of cell phone screen protector.

In addition, in step S30, a surface of the PET release film 1 is further printed with a positioning pattern, and after the step of lightening the screen of the cell phone further includes a step of opening a wallpaper corresponding to the positioning pattern in the cell phone to be applied; at this time, the positioning pattern on the surface of the PET release film 1 is aligned with the pattern in the wallpaper of the cell phone to achieve further positioning. In addition, a QR code can be printed on the surface of the PET release film 1, and a wallpaper corresponding to the positioning pattern on the surface of the PET release film 1 can be obtained by scanning the WeChat QR code.

Further, in the step S40, the position corresponding to the second portion 32 of the cell phone screen protector is manually pressed, and the first part is uncovered by the second label 311 printed with the number 2. Specifically, the first part 31 is upwardly uncovered by pulling the second label 311 printed with the number 2 or the edge of the first part 31, and then pulling the second label 311 printed with the number 2 to tear off en end of the first part 31 adjacent to the second part 32, such that the end portion of the end of the first part 31 adjacent to the second part 32 is separated from the TPU hydrogel film 2 and abutted on the screen. At this time, the first part 31 and the second part 32 are at a certain angle, and the position of the first part 31 relative to the second part 32 is fixed to facilitate the next step S50.

Further, in the step S50, when the scraping card is used, the scraping card is placed along the width direction of the cell phone screen protector and placed at a certain angle with the screen, the scraping card is pushed from an end of the first part 31 adjacent to the second part 32 to an end of the first part 31 away from the second part 32 until that the first part 31 is pasted on the planar portion of the screen. In the step, it is mainly for a curved screen.

Further, in an embodiment of the present application, when step S50 is performed, the bottom end of the scraping card is placed in parallel with the die-cut line, and the initial position of the scraping card is located in front of the die-cut line to prevent the scraping card from leaving indentation at the position of the die-cut line. In the embodiment, the bottom end of the scraping card is the end of the scraping card that is in contact with the TPU hydrogel film 2, and the initial position of the scraping card has a distance from the die-cut line, referring to the die-cut line, the front of the die-cut line is the direction toward the first part.

It can be understood that, in other embodiments of the present application, when step S50 is performed, the bottom end of the scraping card may also be obliquely placed with the die-cut line, and the initial position of the scraping card is located on the die-cut line. In the present embodiment, it is easy to leave an indentation at the position of the die-cut line. The bottom end of the scraping card is the end of the scraping card that is in contact with the TPU hydrogel film 2.

Further, in the step S60, the second part 32 is uncovered by the third label 321 printed with the number 3. Specifically, the second part 32 is upwardly uncovered by pulling the second part 32 printed with the number 3 or the edge of the third label 321, such that the second part 32 is at an angle of 90 degrees with the screen, and then pulling the second label 311 printed with the number 3 to tear off an end of the second part 32 adjacent to the first part 31, such that the end of the second part 32 adjacent to the first part 31 is separated from the TPU hydrogel film 2 and abutted on the screen to facilitate the next operation. In addition, when the scraping card is used, the scraping card is placed along the width direction of the cell phone screen protector and obliquely placed with the screen, the scraping card is pushed from an end of the second part 32 adjacent to the first part 31 to an end of the second part 32 away from the first part 31 until that the second part 32 is pasted on the planar portion of the screen. In the step, it is mainly for a curved screen.

Further, in the step S70, the scraping card is scraped outwardly along the curved edge of the screen until both side edges of the TPU hydrogel film 2 are sticked to both side edges of the screen.

Further, in the step S80, the outermost PET release film 1 is torn off by pulling the fourth label 11 printed with the numeral 4, and then the both sides of the screen are smoothed by hand. At this time, the applying process is completed. If there are sporadic bubbles remaining, they will slowly disappear after about 24 hours. Among them, the TPU hydrogel film 2 stuck to the screen of the cell phone can withstand the explosion-proof performance test, and collects water into beads, oleophobic and hydrophobic.

Second Embodiment

Figure 4:
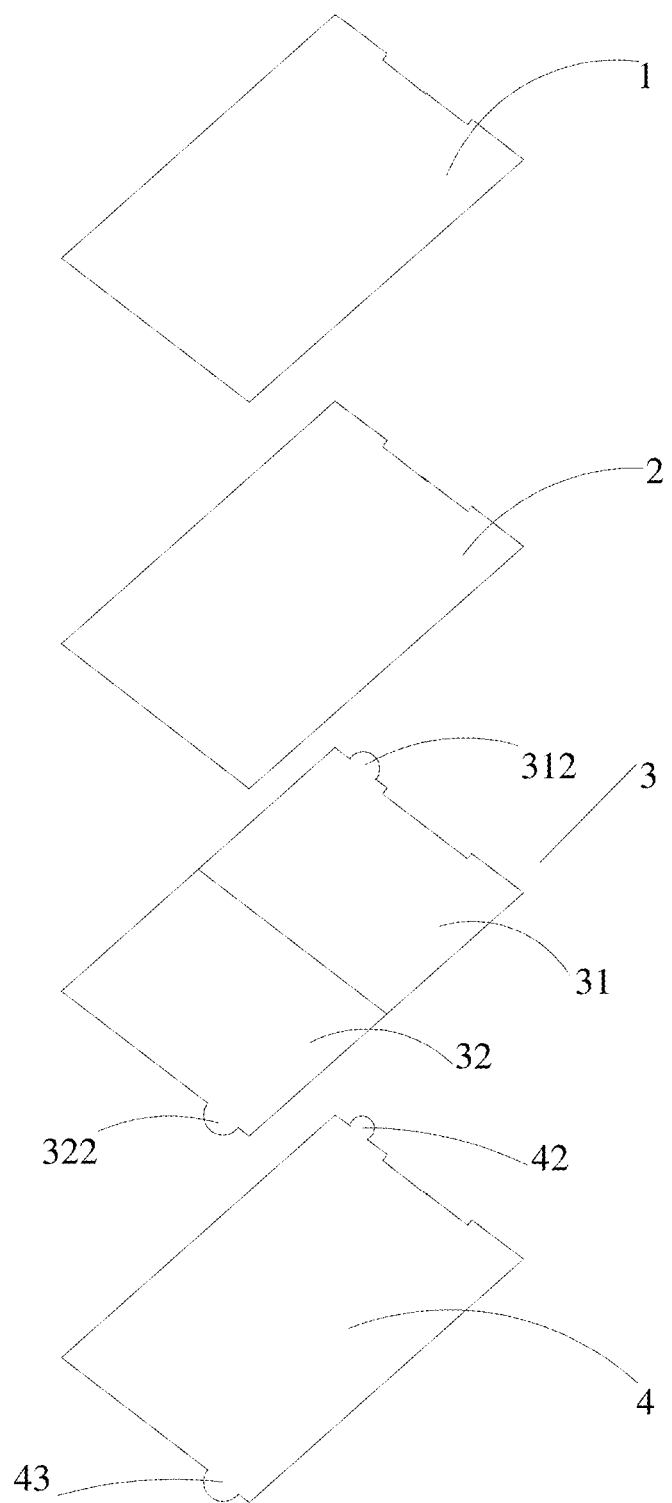
FIG. 4 is another structural exploded view of a cell phone screen protector according to an embodiment of the present application.
Figure 5:
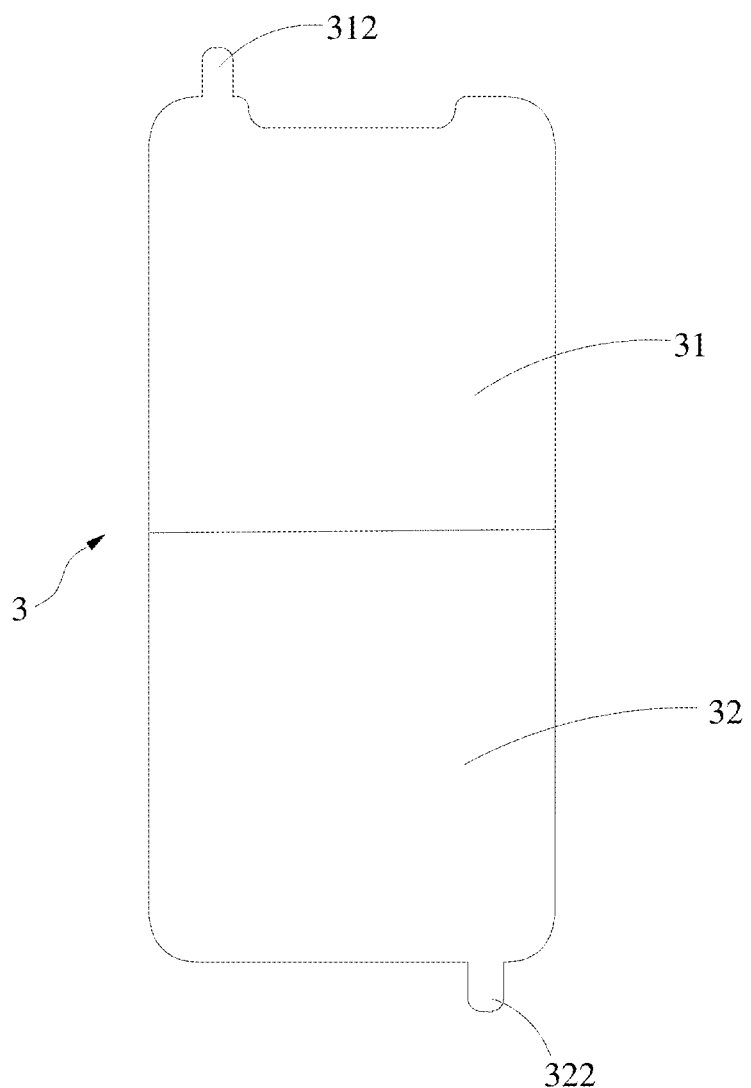
FIG. 5 is another structural exploded view of a silicone protective film in a cell phone screen protector according to an embodiment of the present application.

Please refer to FIG. 4 and FIG. 5, as another embodiment of the method for applying a screen protector to a cell phone screen protector according to the present application, the steps of the method for applying a screen protector to a cell phone screen protector in the embodiment are basically the same as the steps of applying a screen protector to the cell phone in the first embodiment, and the difference is that a top end of the release liner 4 of the embodiment extends outward to form a first lug 42, a bottom end of the release liner 4 extends outward to form a second lug 43, and a top end of the first part 31 extends outward to form a third lug 312, the third lug 312 is disposed corresponding to the position of the first lug 42, and a bottom end of the second part 32 extends outward to form a fourth lug 322, the fourth lug 322 is disposed corresponding to the position of the second lug 43. In this way, the he first lug 42 and the second lug 43 are disposed to facilitate tearing off the release liner 4; the third lug 312 is disposed at the top end of the first part 31, and the fourth lug 322 disposed at the bottom end of the second part 32, thereby the first part 31 and the second part 32 can be quickly tron off to achieve separating the silicone protective film 3 from the TPU hydrogel film 1, and the applying efficiency is improved. In addition, in the embodiment, the third lug 312 and the fourth lug 322 may be disposed at other positions of the silicone protective film 3 according to actual conditions and specific requirements, which are not limited herein.

The aforementioned embodiments are only preferred embodiments of the present invention, and should not be regarded as being limitation to the present invention. Any modification, equivalent replacement, improvement, and so on, which are made within the spirit and the principle of the present invention, should be included in the protection scope of the present application.

What is claimed is:

1. A method for applying a cell phone screen protector, comprising the steps:
    step 1, providing a cell phone screen protector and a cell phone of an handset type to be applied, wherein the cell phone screen protector comprises a PET release film, a TPU hydrogel film, a silicone protective film, and a release liner sequentially stacked from top to bottom, the silicone protective film is provided with a die-cut line dividing the silicone protective film into a first part and a second part, and
    edges of the PET release film, the first part and the second part of the silicone protective film, and the release liner respectively extend labels outwards;
    step 2, cleaning a screen of the cell phone to be applied;
    step 3, tearing off the release liner by a label of the release liner,
        simultaneously lightening the screen of the cell phone to be applied,
        sticking the silicone protective film on the screen referring to a position at the cell phone screen protector corresponding to the cell phone, and
    printing scale lines at a left side and right side of the cell phone screen protector;
    step 4, pressing the cell phone screen protector, and uncovering the first part via the label of the first part;
    step 5, using a scraping card to scrape slightly from top to bottom until the first part sticks to a planar portion of the screen;
    step 6, uncovering the second part via the label of the second part, and using the scraping card to scrape slightly from top to bottom until the second part sticks to a planar portion of the screen;

step 7, using the scraping card to scrape outwardly along a curved edge of the screen until both sides of the TPU hydrogel film are stuck to both sides of the screen;

step 8, tearing off the PET release film by the label of the PET release film, and smoothing both sides of the screen via a hand;

wherein a surface of the PET release film is further printed with a positioning pattern, the step 3 further comprises, after the operation of lightening the screen of the cell phone, opening a wallpaper corresponding to the positioning pattern, in the cell phone to be applied, and aligning the positioning pattern on the surface of the PET release film with a pattern in the wallpaper of the cell phone to achieve further positioning;

wherein, a top end of the release liner extends outward to form a first label, a right side of the first part extends outward to form a second label, a right side of the second part extends outward to form a third label, and a right side of the PET release film extends outward to form a fourth label;

wherein, a handset notch corresponding to the cell phone to be applied is formed equally in position and dimensions on the PET release film, the TPU hydrogel film, the silicone protective film, and the release liner; and wherein, the first label in entirety is horizontally within the handset notch, the fourth label partially overlaps the second and the third label, and the second label is adjacent to the third label.

2. The method of claim 1, wherein a top end of the release liner extends outward to form a first lug, a bottom end of the release liner extends outward to form a second lug, a top end of the first part corresponding to the position of the first lug extends outward to form a third lug, and a bottom end of the second part corresponding to the position of the second lug extends outward to form a fourth lug.

3. The method of claim 1, wherein the step 2 comprises the following steps:

wiping the screen of the cell phone to be applied with an alcohol bag;

wiping the screen of the cell phone to be applied with a non-woven fabric.

4. The method of claim 1, wherein in the step 3, repeatedly performing the step of sticking the silicone protective film on the screen referring to a position at the cell phone screen protector corresponding to a handset and printing scale lines at a left side and right side of the cell phone screen protector.

5. The method of claim 1, wherein the step 4 of uncovering the first part by the label of the first part comprises: uncovering the first part upwardly, then pulling the second label to tear off an end of the first part adjacent to the second part, such that the end of the first part adjacent to the second part is separated from the TPU hydrogel film and abuts on the screen.

6. The method of claim 1, wherein in the step 6, the step of uncovering the second part via the label of the second part comprises: uncovering the second part upwardly to reach an angle between the second part and the screen of 90 degrees, then pulling the third label to tear off an end of the second part adjacent to the first part, such that the end of the second part adjacent to the first part is separated from the TPU hydrogel film and abuts on the screen.

7. The method of claim 1, wherein in the step 5, a bottom end of the scraping card is placed in parallel with the die-cut line, and an initial position of the scraping card is located in front of the die-cut line.

8. The method of claim 1, wherein in the step 5, a bottom end of the scraping card is obliquely placed with the die-cut line, and an initial position of the scraping card is located on the die-cut line.

9. The method of claim 1, wherein a length ratio of the first part and the second part of the silicone protective film ranges from 1:2 to 1:1.

10. The method of claim 1, wherein the first label, the second label, the third label, and the fourth label are in an arched or semi-circular.

11. The method of claim 1, wherein the first label is integrally formed with the release liner, the second label is integrally formed with the first part, the third label is integrally formed with the second part, and the fourth label is integrally formed with the PET release film.

12. The method of claim 1, wherein a QR code can be printed on the surface of the PET release film, and a wallpaper corresponding to the positioning pattern on the surface of the PET release film can be obtained by scanning the QR code.

* * * * *